(12) United States Patent  
Inazuka

(10) Patent No.: US 6,212,335 B1  
(45) Date of Patent: Apr. 3, 2001

(54) DRIVING MECHANISM OF LENS BARRIER AND ZOOM LENS FOR CAMERA

(75) Inventor: Masahiro Inazuka, Saitama-ken (JP)

(73) Assignee: Asahi Kogaku Kogyo Kabushiki Kaisha, Tokyo (JP)

(*) Notice: Subject to any disclaimer, the term of this patent is extended or adjusted under 35 U.S.C. 154(b) by 0 days.

(21) Appl. No.: 09/422,095

(22) Filed: Oct. 20, 1999

(30) Foreign Application Priority Data

Oct. 20, 1998 (JP) ................................................ 10-297806

(51) Int. Cl.$^7$ .................................................. G03B 17/04
(52) U.S. Cl. ............................. 396/85; 396/349; 396/448
(58) Field of Search .............................. 396/85, 86, 87, 396/349, 448

(56) References Cited

U.S. PATENT DOCUMENTS

| | | | |
|---|---|---|---|
| 5,461,441 | * 10/1995 | Kotani | 396/448 |
| 5,617,167 | * 4/1997 | Kaji | 396/448 |
| 5,708,884 | * 1/1998 | Morishita | 396/349 |
| 5,822,634 | * 10/1998 | Morishita | 396/349 |
| 5,842,057 | * 11/1998 | Nomura et al. | 396/87 |
| 5,892,996 | * 4/1999 | Yokota | 396/349 |
| 5,950,028 | * 9/1999 | Ito | 396/349 |

* cited by examiner

Primary Examiner—W. B. Perkey  
(74) Attorney, Agent, or Firm—Greenblum & Bernstein P.L.C.

(57) ABSTRACT

A barrier mechanism for a zoom lens camera, is provided with a zooming mechanism; a barrier opening/closing mechanism; a motor; a first gear train connected to the motor; a second gear train connected to the zooming mechanism; and a planetary gear mechanism. The planetary gear mechanism includes a sun gear, a first arm rotatable about the rotation axis of the sun gear, a planetary gear rotatably supported by the first arm, the planetary gear engaging the sun gear, a barrier drive gear fixed to the first arm, rotation axis of the barrier drive gear coincides of the rotation axis of the first arm. The sun gear is connected to the first gear train, the planetary gear being movable between a first and second positions, the planetary gear being engaged with the second gear train when located at the second position and disconnected therefrom when moved away from the second position, the barrier drive gear being connected to the barrier opening/closing mechanism, the barrier opening/closing mechanism being driven when the planetary gear moves between the first and second positions.

14 Claims, 8 Drawing Sheets

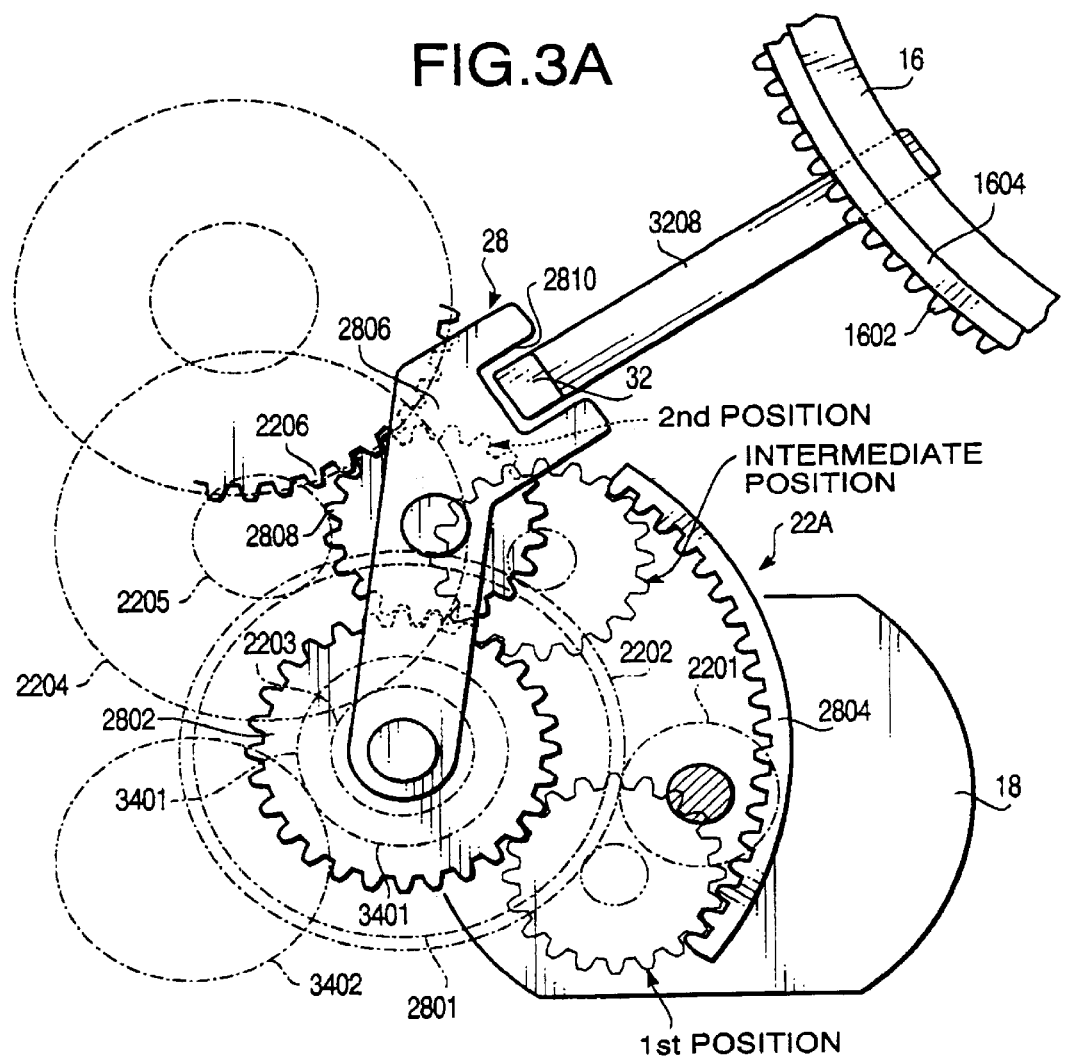
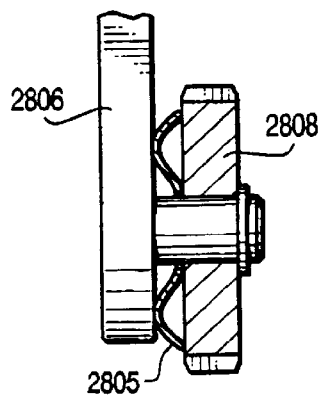

DRIVING MECHANISM OF LENS BARRIER AND ZOOM LENS FOR CAMERA

BACKGROUND OF THE INVENTION

The present invention relates to a driving mechanism of a lens barrier and zoom lens for a camera provided with a zooming mechanism.

Recent compact cameras are provided with zooming mechanisms. A zooming mechanism is constructed such that a driving force of a zoom motor is transmitted through a zoom gear train to a lens drive mechanism for driving a lens in a direction of the optical axis.

On the other hand, compact cameras are generally provided with lens barrier mechanisms. A lens barrier mechanism is provided with a lens barrier which is movable between a close position and an open position. When the lens barrier is located at the close position, the lens barrier is positioned in front of the lens to cover the same, while when the lens barrier is located at the open position, the lens barrier is completed retracted from the close position.

In order to reduce a manufacturing cost, it is preferable that the both mechanisms are driven by a single motor.

However, if the both mechanisms are merely connected to a single drive source, when the lens barrier mechanism is being driven, the zoom lens should not be driven, and when the zooming mechanism is being driven, the lens barrier should not be driven. Therefore, in both mechanism, extra strokes for not driving the zoom lens and the lens barrier should be provided, which increase the size of a camera.

SUMMARY OF THE INVENTION

It is therefore an object of the present invention to provide an improved lens barrier mechanism which opens/closes a lens barrier using a driving force of a zoom motor, and still enables downsizing and cost-reduction of a camera.

For the above object, according to the invention, there is provided a driving mechanism of a barrier and a zoom lens for a camera which is provided with: a zooming mechanism for moving the zoom lens; a barrier opening/closing mechanism; a motor; a first gear train connected to the motor; a second gear train connected to the zooming mechanism; a planetary gear mechanism including a sun gear, a first arm rotatable about the rotation axis of the sun gear, a planetary gear rotatably supported by the first arm, the planetary gear engaging the sun gear, a barrier drive gear fixed to the first arm, rotation axis of the barrier drive gear coincides of the rotation axis of the first arm, the sun gear being connected to the first gear, the planetary gear being movable between a first and second positions, the planetary gear being engaged with the second gear train when located at the second position and disconnected therefrom when moved away from the second position, the barrier drive gear being connected to the barrier opening/closing mechanism, the barrier opening/closing mechanism being driven when the planetary gear moves between the first and second positions.

Optionally, the barrier mechanism may further include an engaging mechanism that is engaged with the first arm to stay at the second position.

Further, the camera is provided with a lens barrel that can be located at a retracted position or a position within a zooming area, and the engagement between the engaging mechanism with the first arm is released when the lens barrel is located in the zooming area.

Specifically, the planetary gear mechanism is further provided with an arch-shaped inner threaded gear on an outside, in a radial direction of the sun gear. The planetary gear engages the arc-shaped inner threaded gear when the planetary gear is located at an any point between an intermediate position, which is a position between the first and second positions, and the first position. The engagement between the planetary gear and the inner threaded gear is released when the planetary gear is located at the second position.

Further, the barrier is located at the close position when the planetary gear is located at the first position, wherein the barrier is located at the open position when the planetary gear is located at a position between the intermediate position and the second position.

When the camera is powered ON, the motor is driven to move, through the first gear train, the planetary gear from the first position to the second position via the intermediate position, and thereafter to drive, through the second gear train, the zooming mechanism to move the zoom lens from the retracted position to the wide extremity.

Further, when the camera is powered OFF, the motor is driven to move, through the second gear train and zooming mechanism, the zoom lens to the retracted position, and thereafter, to move the planetary gear from the second position to the first position via the intermediate position.

Optionally, the engaging mechanism engages the first arm to stay at the second position only when the zoom lens is located at the retracted position, the engagement between the first arm and the engaging mechanism being released when the zoom lens is moved from the retracted position to the wide extremity.

Further optionally, the engaging mechanism includes a movable rod which extend in a direction parallel to the optical axis of the zoom lens and is movable in the direction of the optical axis. The movable rod is engaged with an engaging portion formed on the first arm to prevent the first arm from rotating.

In this case, if the motor is driven such that the barrier is moved from the open position to the close position when the lens barrel is located at the wide extremity, the engagement between the barrier and the barrier mechanism is released when the planetary gear moves from the intermediate position to the first position.

Optionally, the barrier mechanism includes a gear train which is driven when the first arm is rotated, and a second arm which is connected to the barrier, one gear included in the gear train is formed with a sector-shape opening, the second arm being provided with an engaging portion which is to be engaged with the sector-shape opening, the second arm being rotated by the one gear when the engaging portion contacts an end of the sector-shaped opening.

Further, the barrier and the second arm are connected by a spring, the spring urges the barrier to move toward the close position when the barrier is located in the vicinity of the close position, and the spring urges the barrier to move toward the open position when the barrier is located in the vicinity of the open position.

According to another aspect of the invention, there is provided a camera, provided with: a zoom lens; a barrier for covering/exposing the zoom lens; a zooming mechanism for driving the zoom lens to move in a direction of an optical axis of the zoom lens; a barrier mechanism for driving the barrier to open/close the zoom lens; a motor; a first gear train connected to the motor; a second gear train connected to the zooming mechanism; a planetary gear mechanism including a sun gear, a first arm rotatable about the rotation axis of the sun gear, a planetary gear rotatably supported by the first arm, the planetary gear engaging the sun gear, a barrier drive gear fixed to the first arm, rotation axis of the barrier drive gear coincides of the rotation axis of the first arm, the sun gear being connected to the first gear train, the planetary gear being movable between a first and second positions, the planetary gear being engaged with the second gear train when located at the second position and disconnected therefrom when moved away from the second position, the barrier drive gear being connected to the barrier opening/closing mechanism, the barrier opening/closing mechanism being driven when the planetary gear moves between the first and second positions.

BRIEF DESCRIPTION OF THE ACCOMPANYING DRAWINGS

FIG. 3A shows an enlarged front view around a first arm;

FIG. 3B shows a side view of a planetary gear supported on the first arm;

DESCRIPTION OF THE EMBODIMENT

The invention will be described with reference to the accompanying drawings.

Figure 1:
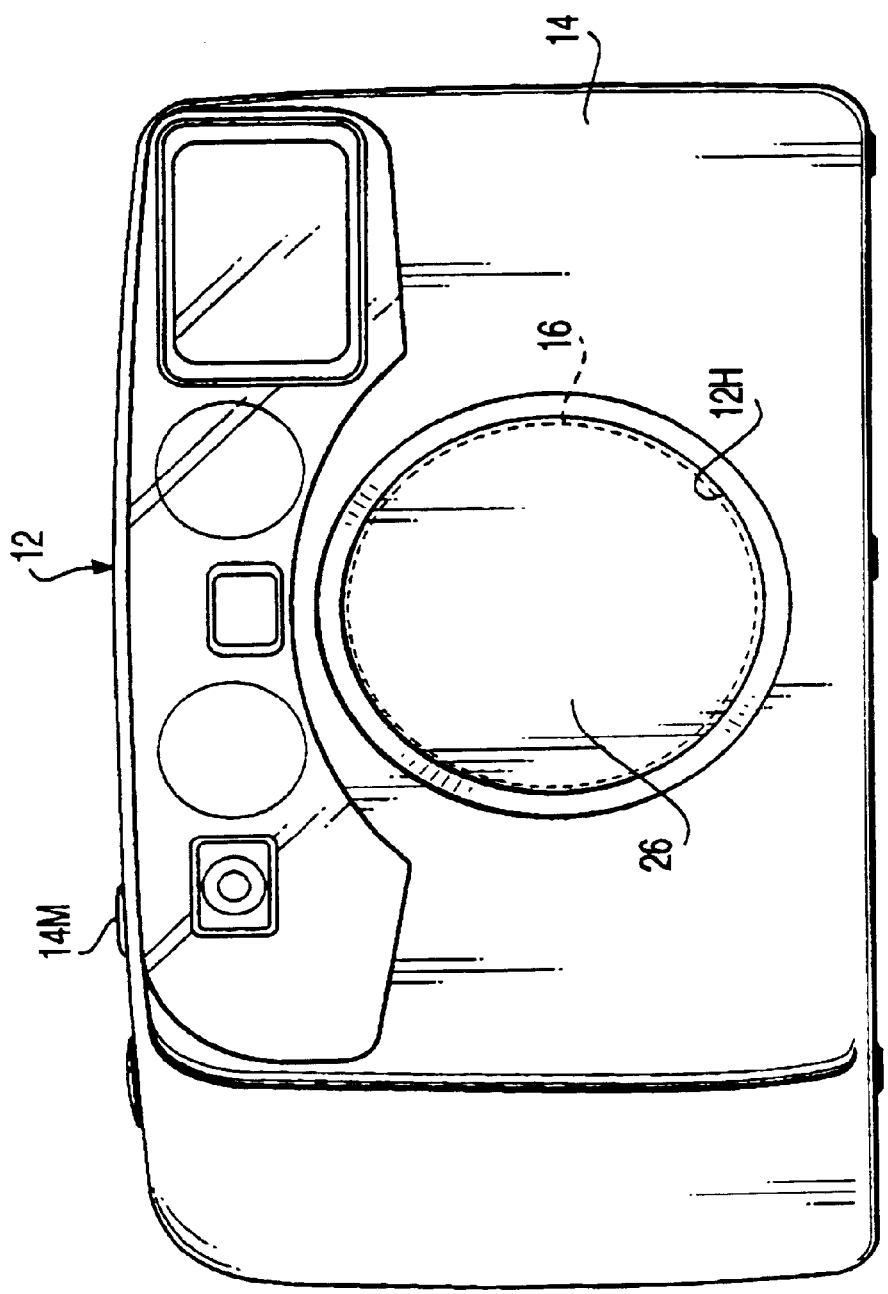
FIG. 1 is a front view of a zoom lens camera employing a lens barrier mechanism according to an embodiment of the invention.

FIG. 1 is a front view of a zoom lens camera 12 employing a lens barrier mechanism according to an embodiment of the invention. As shown in FIG. 1, at a central portion of a front surface of a body 14 of the camera 12, an opening 12H for allowing a lens (barrel) 16 to protrude therethrough is formed. When a power switch 14M is turned ON and the camera 12 is powered ON, the lens 16 is protruded from the front surface of the camera 12 and is located at a position within a zooming area in which the lens 16 is movable for zooming. When the power switch is turned OFF and the camera 12 is powered OFF, the lens is retracted inside the camera body 14, and further a barrier 26 closes the opening 12H.

Figure 2:
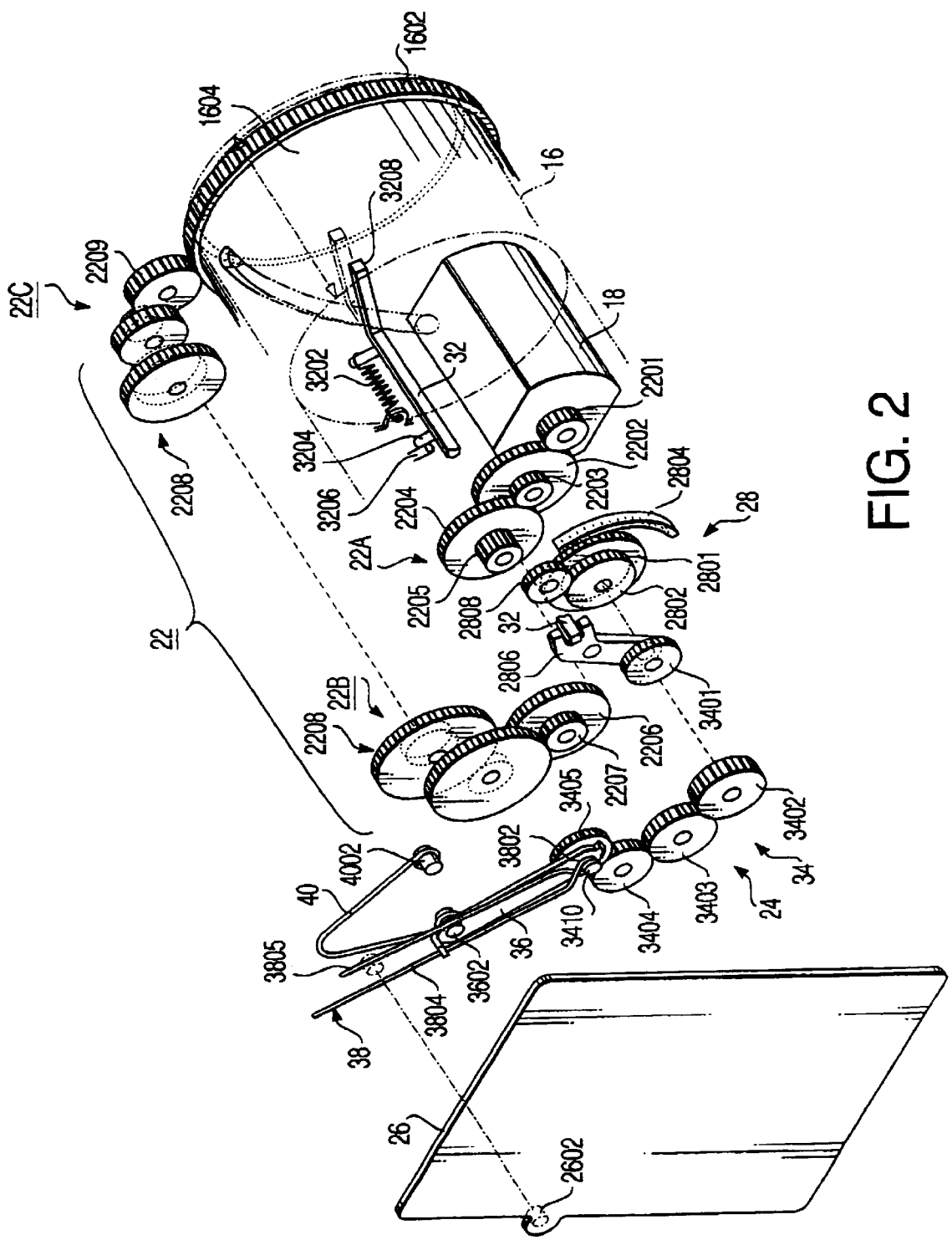
FIG. 2 is a perspective exploded view of main part of zooming mechanism and lens barrier mechanism in the camera shown in FIG. 1.

FIG. 2 is an exploded perspective view of main part of a zooming mechanism and a lens barrier mechanism of the camera 12.

The camera 12 is provided a zoom motor 18, which is located at a lower right-hand side of the lens barrel 16 in FIG. 2. A zooming mechanism includes a zoom gear train 22 and a cam ring 1604. The zoom gear train 22 including a first gear train 22A, a second gear train 22B and a third gear train 22C, which are connected in this order, is provided around the left-hand side of the lens barrel 16. The output gear 2209 of the third gear train 22C is engaged with a gear portion of a cam ring 1604. The lens barrel 16 is moved in a direction of the optical axis thereof when the cam ring 1604 is rotated. An example of a structure of a lens which moves in the direction of the optical axis in accordance with rotation of a cam ring is disclosed in U.S. Pat. No. 4,911,542, and teachings of which are incorporated herein by reference. It should be noted that the structure is not limited to one disclosed in the above patent, and any type of zoom lens employing a similar cam mechanism is applicable.

On the left-hand side of the zoom gear train 22, in FIG. 2, a barrier mechanism 24 is provided. By the barrier mechanism 24, the barrier 26 is moved between a close position at which the barrier 26 closes the opening 12H, and an open position at which the barrier 26 is retracted from the opening 12H.

The zoom gear train 22 further includes a planetary gear mechanism 28 which is connected to the first gear train 22A. The planetary gear mechanism 28 can be connected with or disconnected from the second gear train 22B.

The first gear train 22A includes a small first gear 2201 which is secured to a spindle shaft of the zoom motor 18, with which a large second gear 2202 is engaged. A small third gear 2203 is secured on the same shaft on which the second gear 2202 is secured. The small third gear 2203 is engaged with a large fourth gear 2204. A small fifth gear 2205 is secured on the same shaft on which the fourth gear 2204 is secured.

The planetary gear structure 28 includes a large gear 2801, a sun gear 2802, an arc-shaped gear 2804, a first arm 2806, and a planetary gear 2808 (see FIGS. 2 and 3A).

The large gear 2801 always engages the fifth gear 2205. The sun gear 2802 has a smaller diameter than the large gear 2801, and is secured on the shaft on which the large gear 2801 is secured. The arc-shaped gear 2804 has an arc shape whose center is on a rotation axis of the sun gear 2802 and has a predetermined length. The arc-shaped gear 2804 is arranged apart from the sun gear 2802 in a direction of the radius thereof. The first arm 2806 is rotatable about the rotation axis of the sun gear 2802. The planetary gear 2808 is rotatably supported at the distal end portion of the arm 2806. The planetary gear 2808 is engaged with the sun gear 2802, and can be engaged with the inner thread of the arc-shaped gear 2804.

FIG. 3A shows an enlarged front view of a first arm 2806, and FIG. 3B shows a side view of the planetary gear 2808 supported on the first arm 2806. As shown in FIG. 3B, between the first arm 2806 and the planetary gear 2808, a friction spring 2805 is provided so that the planetary gear 2808 easily follow the rotation of the sun gear 2802.

At the proximal end portion of the first arm 2806, a first gear 3401 of the barrier drive gear train 34 is fixed such that the gear 3401 rotates together with the first arm 2806 about the rotation axis of the sun gear 2802.

FIGS. 4A–4D show positions A–D of the first arm 2806 and positions of the lens barrier 26 corresponding to the positions of the first arm 2806, respectively, when the barrier 26 is moved from the close position to the open position. The position of the planetary gear 2808 in FIG. 4A will also be referred to as a first position, and the position of the planetary gear 2808 in FIG. 4C will also be referred to as an intermediate position. Further, the position of the planetary gear 2808 in FIG. 4D will also be referred to as a second position. The first, intermediate and second positions of the planetary gear 2808 are also indicated in FIG. 3A. The planetary gear 2808 is movable, with being engaged with both the sun gear 2802 and the arc-shaped gear 2804, between position A (see FIG. 4A) and position C (see FIG. 4C). Further, the planetary gear 2808 is movable between position C and position D (see FIG. 4D) with being engaged only with the sun gear 2802. Between positions C and D, the planetary gear 2808 is not engaged with the arc-shaped gear 2804.

Figure 4A:
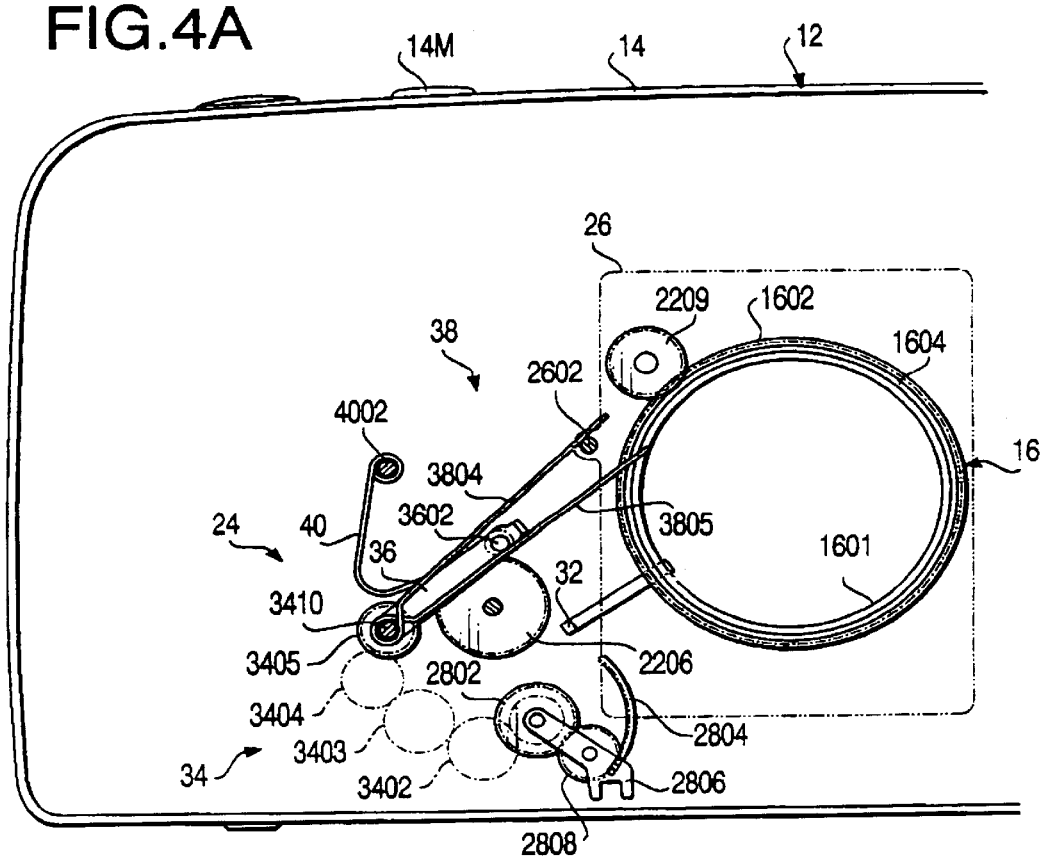
FIGS. 4A–4F show positions A–F of the first arm and the planetary gear, and positions of the lens barrier.

When the planetary gear 2808 is located at position A (FIG. 4A), the barrier 26 is located at the close position at which the barrier 26 completely closes the opening 12H formed on the camera body 14, and when the planetary gear 2808 is located at position B, the barrier 26 is half-opened. When the planetary gear 2808 has reached position C, due the biasing force of the omega spring 40, the barrier 26 is located at the open position (FIG. 4C). When the planetary gear 2808 is located at position D, the barrier 26 is located at the open position (see FIG. 4D), and further, the straight portion 3804 is pushed by the pin 3602 of the second arm 36 so that the barrier 26 is biased to stay the open position. The open/close movement of the barrier 26 will be described in detail later.

When the planetary gear 2808 located at position D is moved to position E, the barrier 26 stays the open position. When the planetary gear 2808 is located at position E (FIG. 4E), the barrier 26 starts to move toward the close position. When the planetary gear 2808 has reached position F (FIG. F), due to the biasing force of the omega spring 40, the barrier 26 is urged to be located at the close position, and thereafter, the planetary gear 2808 further proceeds to position A (FIG. 4A). When the planetary gear 2808 is located at position A, the straight portion 3805 of the spring 38 is pushed by the pin 3602 so that the barrier 26 is biased to stay at the close position. The open/close movement of the barrier 26 will be described in detail later.

As shown in FIG. 3A, the distal end portion of the first arm 2806 is formed to be a cutout portion 2810. As shown in FIG. 2, a lock pin 32 is provided such that a front end of the lock pin 32 is engaged with the cutout portion 2810 when the planetary gear 2808 is located at position C (i.e., the second position). Specifically, as shown in FIG. 2, the lock pin 32 is urged to move toward the front side by a spring 3202. An end of the spring 3202 is fixed to the lock pin 32, and the other end of the spring 3202 is fixed to a frame member inside the camera body 14. The lock pin 32 is provided with an engaging pin 3204, which is engaged with a stopper 3206 provided to the frame member of the camera body 14. When the front end portion of the lock pin 32 is engaged with the cutout portion 2810 of the first arm 2806, the lock pin 32 is biased toward the front side by the spring 3202, while due to the engagement of the engaging pin 3204 and the stopper 3206, further movement of the lock pin 32 is prevented.

The second gear train 22B includes a large sixth gear 2206 to be connected to the planetary gear 2808 located at position C, a small seventh gear 2207 fixed to the shaft to which the sixth gear 2206 is fixed, and the plurality of gears 2208 of the third gear train 22C are connected to the seventh gear 2207 to transmits the force sequentially. Further, the output gear 2209 of the third gear train 22C is connected to the end of the plurality of gears 2208. The output gear 2209 is connected to a threaded portion of a cam ring 1604. When the zoom motor 18 is driven, the rotational force is transmitted through the zoom gear train (i.e., the first and second gear trains 22A, 22B and 22C), thereby the cam ring 1604 is driven to rotate. Then, in accordance with engagement of cam mechanism formed between the cam ring 1604 and lens barrel 16, the lens barrel 16 is moved in the direction of the optical axis thereof.

The barrier mechanism 24 includes a gear train 34 connected to the zoom gear train 22, a second arm 36, a spring 38 and the omega spring 40.

The gear train 34 includes the first gear 3401 fixed to the proximal end portion of the first arm 2806, a second gear 3402 engaged with the first gear 3401, a third gear 3403 engaged with the second gear 3402, a fourth gear 3404 engaged with the third gear 3403, and a fifth gear 3405 engaged with the fourth gear 3404.

Figures 5A, 5B:
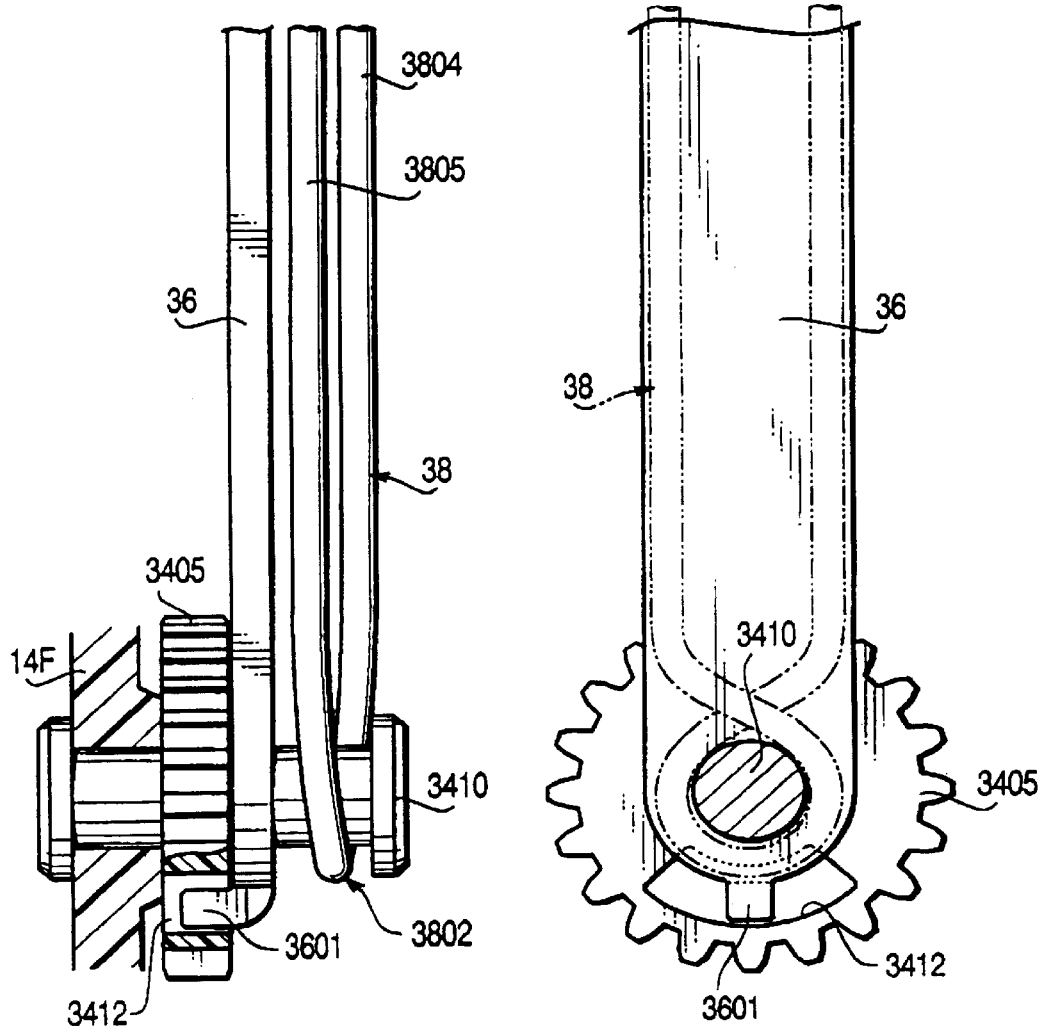
FIGS. 5A and 5B show a structure of a second arm.

FIGS. 5A and 5B show a structure of a proximal end portion of the second arm 36. The fifth gear 3405 is rotatably supported by a supporting shaft 3410 provided on the frame member 14F of the camera body 14. As shown in FIG. 5B, a sector-shaped opening 3412, which is a through-opening in a direction of thickness of the fifth gear 3405, is formed.

The second arm 36 is rotatably supported by the supporting shaft 3410 at the proximal end thereof. At the proximal end side of the second arm 36, an engaging hook 3601 is formed. The engaging hook 3601 is movably inserted in the sector-shaped opening 3412.

Further, the spring 38 is equipped to the supporting shaft 3410. The spring 38 is a steel spring, and has a ring-shaped rounded portion 3802, and first and second straight portions 3804 and 3805, which are parallel to each other and extend along the second arm 36 with being apart by an amount corresponding to the width of the second arm 36. The rounded portion 3802 is rotatably supported by the supporting shaft 3410. It should be noted that the spring 38 is shown in FIGS. 2 and 5A.

At the distal end of the second arm 36, a pin 3602 is provided. The pin 3602 is located between the first and second straight portions 3804 and 3805. Further, as shown in FIG. 2, on a back surface of the barrier 26, a pin 2602 is provided, which is also located between the first and second straight portions 3804 and 3805 of the spring 38. When the second arm 36 is driven to rock for opening/closing the barrier 26, each of the pins 3602 and 2602 contacts one of the first and second straight portions 3804 and 3805 of the spring 38.

The omega spring 40 is a steel spring formed to be V-shaped. One end of the omega spring 40 is secured to the camera body 14 by a supporting pin 4002 which is fixed to the frame of the camera body 14, and the other end of the omega spring 40 is supported by the pin 3602 formed at the distal end of the second arm 36 (see FIG. 6).

Figure 6:
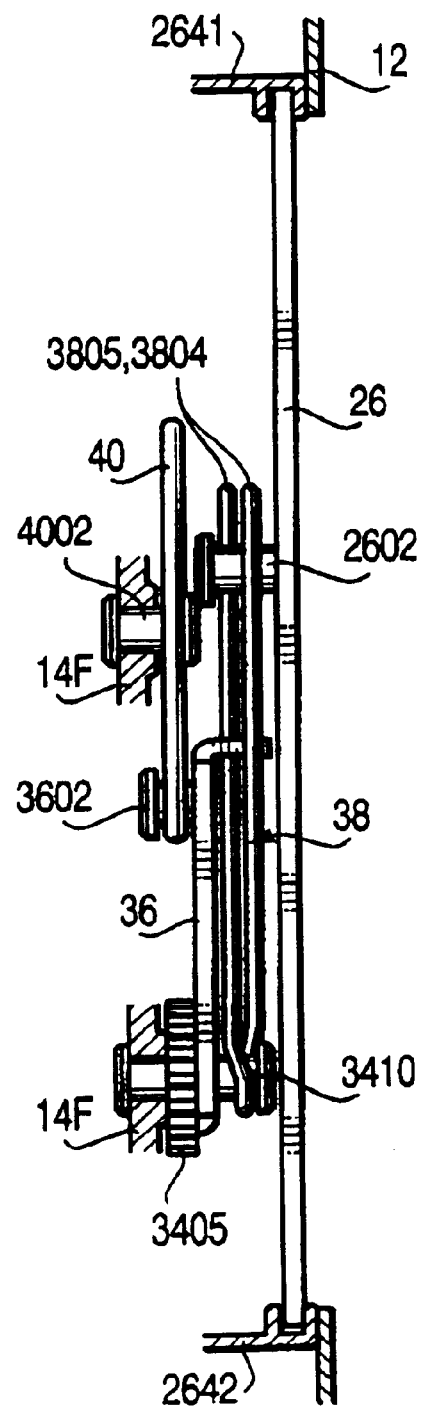
FIG. 6 shows an enlarged side view of the lens barrier and guide rails slidably supporting the lens barrier.

FIG. 6 shows an enlarged cross section of the lens barrier 26 and guide rails 2641 and 2642 slidably supporting the lens barrier 26. Inside the camera body 14, a pair of guide rails 2641 and 2642 are provided. The guide rails 2641 and 2642 extend in a horizontal direction when the camera 12 is held in landscape.

Figure 4B:
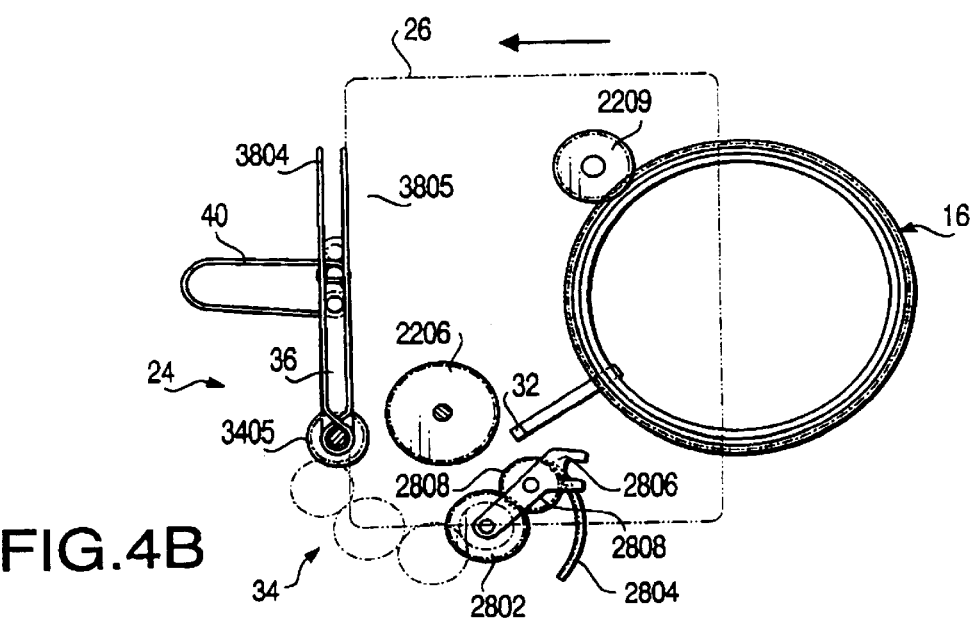
Figure 4C:
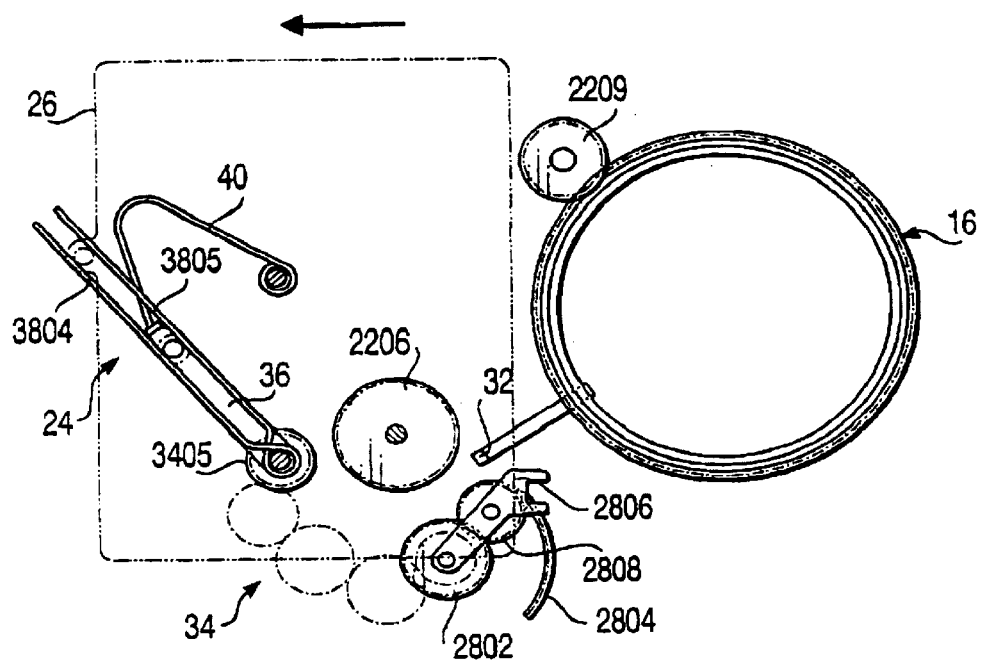

As shown in FIGS. 4A–4C, when the planetary gear 2808 is moved from the first position (FIG. 4A) to position B (FIG. 4B), the omega spring 40 is compressed. When the planetary gear 2808 is further moved to position C (FIG. 4C), the omega spring 40 is restored and the barrier 26 is urged toward the open position. Thereafter, as the planetary gear 2808 is moved to position D (FIG. 4D), an end of the sector-shaped opening pushes the engaging hook 3601, and accordingly, the second arm 36 is further rotated so that the pin 3602 provided on the arm 26 pushes the straight portion 3804 of the spring 28. Thus, when the planetary gear 2808 is located at position D (i.e., the second position), the barrier 26 is urged to stay at the open position. When the planetary gear 2808 is moved from the second position (FIG. 4D) to the intermediate position (FIG. 4E), the omega spring 40 still urges the barrier 26 to stay the open position. When the planetary gear 2808 is further moved from position E, which is equal to position C or the intermediate position (FIG. 4E), the barrier 26 starts to open. When the planetary gear 2808 has reached position F (FIG. 4F) which is close to the first position (i.e., position A), the omega spring 40 is compressed and the restored to bias the barrier 26 toward the close position. When the planetary gear 2808 is further moved from position F to the first position (see FIG. 4A), the pin 3602 pushes the straight portion 3805 of the spring 38 so that the barrier 26 is biased to stay at the close position.

Operation of the lens 16, zoom motor 28, zoom gear train 22, barrier mechanism 24, and movement of the barrier 26 will be described hereinafter.

[When the Camera is Powered ON]

When the camera 12 is not powered ON, the planetary gear 2808 is located at position A (FIG. 4A), at this stage, the lens barrel 16 is retracted inside the camera body 14, and the barrier 26 is located at the close position. Further, the pin 3602 pushes the straight portion 3805, thereby the straight portion 3804 pushes the pin 2602 to bias the barrier 26 to stay at the close position.

When the main switch 14M is turned ON and the camera 12 is powered ON, the zoom motor 18 is driven to rotate forward, and the sun gear 2802 is driven to rotate via the first gear train 22A. It should be noted that, in the description herein, the forward rotation corresponds to an opening movement, and a reverse rotation corresponds to a closing movement of the barrier 26.

When the sun gear 2808 rotates counterclockwise in FIG. 4A, the planetary gear 2808 moves toward position C with being engaged with the sun gear 2802 together with the arc-shaped gear 2804. When the planetary gear 2808 moves from position A to position C, since the planetary gear 2808 engages both the sun gear 2802 and the arc-shaped gear 2804. At this stage, the planetary gear 2808 is not engaged with the sixth gear 2206. Therefore, the rotational force is not transmitted to the second gear train 22B, and accordingly, the lens barrel 16 remains unmoved and located at the retracted position.

Since the first arm 2806 rotates as the planetary gear 2808 moves from position A to position C, the rotational force is transmitted to the gear train 34 through the first gear 3401 thereof since the first gear 3401 is fixed to the first arm 2806. Then, the fifth gear 3405 rotates forward, i.e., in a direction where the barrier 26 is moved toward the open position (counterclockwise in FIG. 4A). When the barrier 26 was previously moved to the close position, the fifth gear 3405 was rotated reversely (clockwise), and therefore, the engaging hook 3601 is abutted against an end of the sector-shaped opening 3412 so that that the pin 3602 pushes the straight portion 3805 of the spring 38 and the barrier 26 is biased to stay at the close position. Therefore, at an initial period when the fifth gear 3405 starts rotating forward, the engagement of the pin 3602 with the straight portion 3805 of the spring 38 is firstly released, and then the only the fifth gear 3605 rotates with second arm 36 staying unmoved until the other end of the sector-shaped opening 3412 pushes the engaging hook 3601.

As the fifth gear 3605 keeps rotating and the other end of the sector-shaped opening 3412 abuts the engaging hook 3601, the second arm 36 starts rotating together with the fifth gear 3405. At this stage, the planetary gear 2808 is located at a position close to position A and between position A and position B.

When the planetary gear 2808 approaches position B, the second arm 36 rotates counterclockwise and moves the barrier 26 toward the open position (FIGS. 4A and 4B). During this movement, the omega spring 40 is compressed as shown in FIG. 4B.

When the planetary gear 2808 has passed position B (FIG. 4B) and reaches the intermediate position (i.e., position C: FIG. 4C), due to the restoring force of the omega spring 40, the second arm 36 is moved counterclockwise, and accordingly, the barrier 26 is moved to the open position (FIG. 4C).

Thereafter, when the planetary gear 2808 is moved from position C to position D, only the fifth gear 3405 is initially rotated until the end of the sector-shaped opening 3412 and the engaging hook 3601 are engaged. After the end of the sector-shaped opening 3412 engages the engaging hook 3601, the second arm 36 is further rotated counterclockwise, thereby the pin 3602 pushes the first straight portion 3804 of the spring 38, and accordingly, the second straight portion 3805 pushes the pin 2602, and the barrier 26 is urged to stay at the open position.

As described above, when the planetary gear 2808 is moved from position C to position D, load applied to the planetary gear 2808 and the gear train 34 is relatively small. Thus, due to the frictional force between the friction spring and the planetary gear 2808, the first arm 2806 rotates in association with the rotation of the sun gear 2802.

Even after the planetary gear 2808 has reached position D, the zoom motor 18 is kept driven forward. Since the planetary gear 2808 is engaged with the sixth gear 2206 at position D, a cam ring 1604 is driven via the second gear train 22B and third gear train 22C to move the lens barrel 16 forward from the retracted position to a position within a zoom area, e.g., at a wide extremity.

Figure 4D:
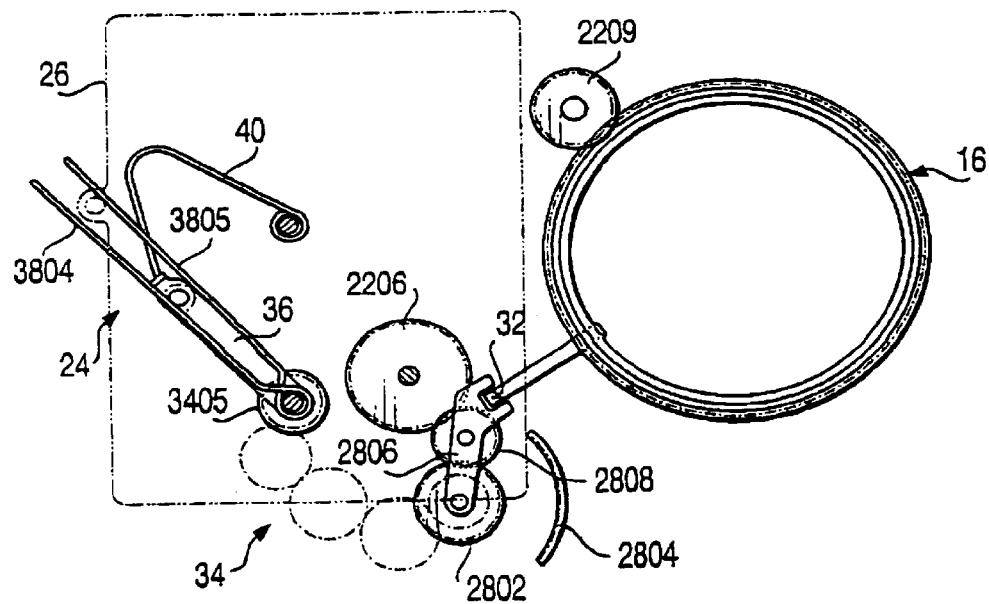
Figure 4E:
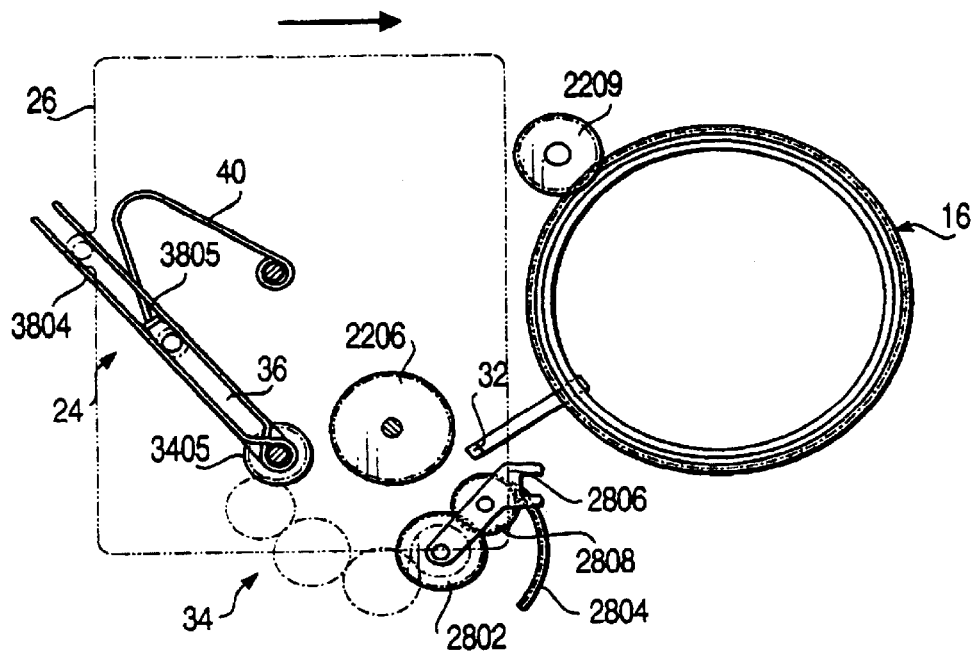

As the lens barrel 16 is moved forward, the end portion 3808 of the lock pin 32, which is urged by the rear side end of the lens barrel 16, is moved forward until the engaging pin 3204 contacts the stopper 3206. When the lock pin 32 is moved forward, the front end portion of the lock pin 32 engages the cutout portion 2810 of the first arm 2806. Thus, when the lens barrel 1601 is located within the zooming area, the first arm 2806 is prohibited from rotating, and stays at a position corresponding to position D of the planetary gear 2808 (FIG. 4D).

The above movement is executed when the camera 12 is powered ON. After the lens barrel 1601 is located within the zooming area, by operating a zoom button of the camera 12, the zoom motor 18 is driven, the rotational force is transmitted to a cam 1602 of the cam ring 1604 through the zoom gear train 22 to rotate the cam ring 1604, and the lens barrel 16 is moved within the zoom area, i.e., between the wide and telephoto extremities for zooming.

Since the rotation of the first arm 2806 is prevented by the lock pin 32, once the planetary gear 2808 is moved from position A to position D, the driving force of the zoom motor 18 is not transmitted to the barrier mechanism 24, and the barrier 26 is maintained to be located at the open position until the camera 12 is powered OFF.

[When the Camera is Powered OFF]

When the camera 12 is powered OFF, the planetary gear 2808 is initially located at position D (i.e., the second position), and the lock pin 32 engages the cutout portion 2810 of the first arm 2806 to prevent the rotation thereof. At this stage, the barrier 26 is located at the open position.

When the main switch 14M is operated to power OFF the camera 12, the zoom motor 18 is driven reversely, and the lens barrel 16 is moved from the zooming area to the retracted position as the zoom gear train 22 is driven and cam ring 1604 is rotated. As the lens barrel 16 is moved to the retracted position, the end portion 3208 of the lock pin 32 is driven to retract by the rear side end of the lens barrel 16, and the engagement between the front end of the lock pin 32 and the cutout portion 2810 of the first arm 2806 is released. When the lens barrel 16 has reached the retracted position, the first arm 2806 is allowed to rotate.

The zoom motor 18 is kept driven reversely, and therefore, the first arm 2806 and the planetary gear 2808 are moved from position D to position E in accordance with the rotation of the sun gear 2802.

When the barrier 26 was previously moved to the open position, the fifth gear 3405 was rotated forward, and therefore, the engaging hook 3601 is abutted against an end of the sector-shaped opening 3412 so that the pin 3602 pushes the straight portion 3804 and the barrier 26 is biased to stay at the open position (FIG. 4D). Therefore, at an initial period when the fifth gear 3405 starts rotating reversely, firstly, the second arm 36 is rotated slightly as the pin 3602 is pushed by the straight portion 3804 of the spring, and thereafter, only the fifth gear 3605 rotates until the other end of the sector-shaped opening 3412 pushes the engaging hook 3601. At this stage, load for moving the barrier 26 is not applied to the planetary gear 2808 and the gear train 34.

Accordingly, the first arm 2806 and the planetary gear 2808 rotates together with the sun gear 2802, from position D to position E without moving the barrier 26.

When the planetary gear 2808 has reached position E together with the first arm 2806, the engaging hook 3601 of the second arm 36 is engaged with the other end of the sector-shaped opening 3412 of the fifth gear 3405.

When the planetary gear 2808 and the first arm 2806 are moved away from position D, engagement between the planetary gear 2808 and the sixth gear 2206 is released. Accordingly, after the planetary gear 2808 is moved away from position D, the driving force of the zoom motor 18 is not transmitted to the cam ring 1604, and accordingly, the lens barrel 16 stays at the retracted position.

After the planetary gear 2808 has reached position E, the zoom motor 18 is kept driven reversely, and the first arm 2806 and the planetary gear 2808 are moved toward position F.

When the first arm 2806 has reached position E, the engaging hook 2601 of the second arm 36 is engaged with the end of the sector-shaped opening 3412 of the fifth gear 3405, the second arm 36 rotates together with the fifth gear 3405. When the second arm 36 rotates, the barrier 26 is moved toward the close position as the pin 3602 pushes the straight portion 2805 of the spring 38.

Figure 4F:
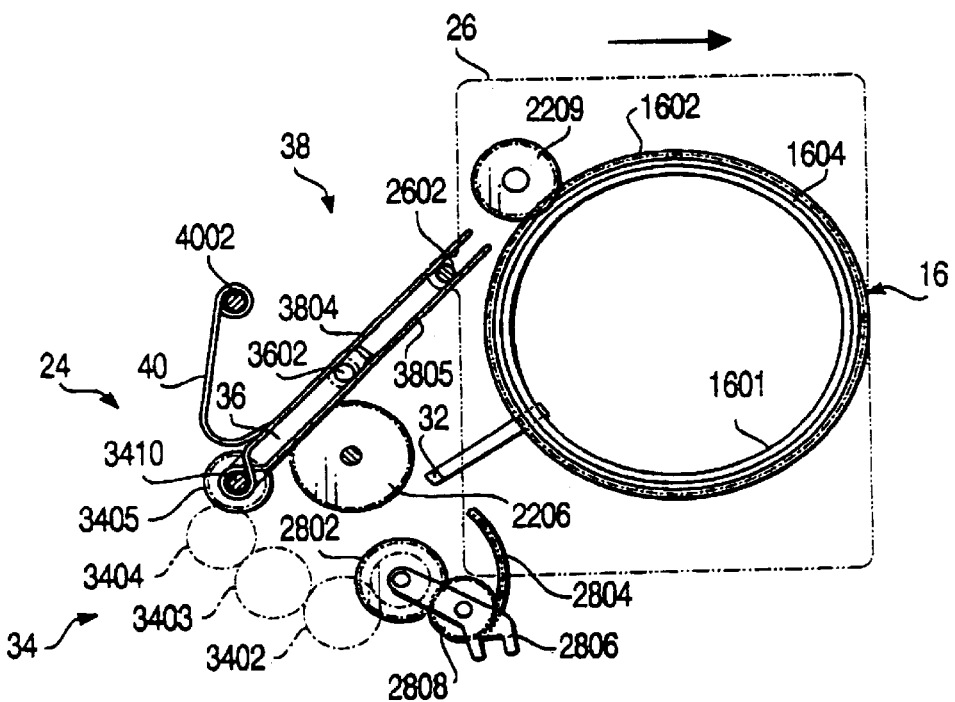

When the planetary gear 2808 is moved from position E to position F which is sufficiently close to position A, the omega spring 40 is compressed and the restored as shown in FIG. 4F. Then, due to the force of the omega spring 40, the second arm 36 is rotated clockwise and the barrier 26 is moved to the close position (FIG. 4F).

The planetary gear 2808 is further moved to position A, and in accordance with this movement, the pint 3602 pushes the straight portion 3805 of the spring 28 as shown in FIG. 4A. At this stage, the barrier 26 is biased to stay at the close position.

After the planetary gear 2808 has reached position A, the power supply to the zoom motor 18 is terminated.

As described above, according to the present invention, the zoom gear train 22 is constituted to include the planetary gear mechanism 28, which is used for selectively transmitting the driving force of the motor 18 to the zooming mechanism 1602 and the lens barrier mechanism 24. Since the zooming operation and the opening/closing operation of the lens barrier can be selectively executed, it is not necessary to provide an extra stroke to either the zooming mechanism or the lens barrier mechanism. Accordingly, the present invention contributes to down sizing and cost-reduction of the zoom lens cameras.

The present disclosure relates to the subject matter contained in Japanese Patent Application No. HEI 10-297806, filed on Oct. 20, 1998, which is expressly incorporated herein by reference in its entirety.

What is claimed is:

1. A driving mechanism of a barrier and a zoom lens for a camera, comprising:
a zooming mechanism for moving said zoom lens;
a barrier opening/closing mechanism;
a motor;
a first gear train connected to said motor;
a second gear train connected to said zooming mechanism; and
a planetary gear mechanism including a sun gear, a first arm rotatable about the rotation axis of said sun gear, a planetary gear being rotatably supported by said first arm, said planetary gear engaging said sun gear, a barrier drive gear fixed to said first arm, rotation axis of said barrier drive gear coincides with the rotation axis of said first arm,
said sun gear being connected to said first gear train, said planetary gear being movable between a first and second positions, said planetary gear being engaged with said second gear train when located at said second position and disconnected therefrom when located away from said second position, said barrier drive gear being connected to said barrier opening/closing mechanism, said barrier opening/closing mechanism being driven when said planetary gear moves between said first and second positions.

2. The barrier mechanism according to claim 1, further comprising an engaging mechanism that is engaged with said first arm to stay at said second position.

3. The barrier mechanism according to claim 2, wherein said camera is provided with a lens barrel that is located at a retracted position or a position within a zooming area, and wherein the engagement between said engaging mechanism with said first arm is released when said lens barrel is located in said zooming area.

4. The driving mechanism according to claim 1, wherein said planetary gear mechanism is further provided with an arch-shaped inner threaded gear on an outside, in a radial direction, of said sun gear, said planetary gear engaging said arc-shaped inner threaded gear when said planetary gear is located at an position between an intermediate position, which is a position between said first and second positions, and said first position, engagement between said planetary gear and said inner threaded gear being released when said planetary gear is located at said second position.

5. The driving mechanism according to claim 4, wherein said barrier is located at the close position when said planetary gear is located at said first position, wherein said barrier is located at the open position when said planetary gear is located at said intermediate position.

6. The driving mechanism according to claim 5, wherein said barrier is biased to stay at the open position when said planetary gear is located at said second position.

7. The driving mechanism according to claim 5, wherein said barrier is biased to stay at the close position when said planetary gear is located at said first position.

8. The driving mechanism according to claim 5, wherein when said camera is powered ON, said motor is driven to move said planetary gear, through said first gear train, from said first position to said second position via said intermediate position, and thereafter, said motor is driven to drive said zooming mechanism to move said zoom lens, through said second gear train, from said retracted position to said wide extremity.

9. The driving mechanism according to claim 8, wherein when said camera is powered OFF, said motor is driven to move, through said second gear train and zooming mechanism, said zoom lens to said retracted position, and thereafter, to move said planetary gear from said second position to said first position via said intermediate position.

10. The driving mechanism according to claim 9, wherein said engaging mechanism engages with said first arm to stay at said second position only when said zoom lens is located at said retracted position, the engagement between said first arm and said engaging mechanism being released when said zoom lens is moved from the retracted position to the wide extremity.

11. The driving mechanism according to claim 10, wherein said engaging mechanism includes a movable rod which extends in a direction parallel to the optical axis of said zoom lens and is movable in the direction of the optical axis, said movable rod being engaged with an engaging portion formed on said first arm to prevent said first arm from rotating.

12. The driving mechanism according to claim 11, wherein said barrier mechanism includes a gear train which is driven when said first arm is rotated, and a second arm which is connected to said barrier, one gear included in said gear train is formed with a sector-shape opening, said second arm being provided with an engaging portion which is to be engaged with said sector-shape opening, said second arm being rotated by said one gear when said engaging portion contacts an end of said sector-shaped opening.

13. The driving mechanism according to claim 12, wherein said barrier and said second arm are connected by a spring, wherein said spring urges said barrier to move toward the close position when said barrier is located in the vicinity of the close position, and wherein said spring urges said barrier to move toward the open position when said barrier is located in the vicinity of the open position.

14. A camera, comprising:

a zoom lens;

a barrier for covering/exposing said zoom lens;

a zooming mechanism for driving said zoom lens to move in a direction of an optical axis of said zoom lens;

a barrier mechanism for driving said barrier to open/close said zoom lens;

a motor;

a first gear train connected to said motor;

a second gear train connected to said zooming mechanism;

a planetary gear mechanism including a sun gear, a first arm rotatable about the rotation axis of said sun gear, a planetary gear rotatably supported by said first arm, said planetary gear engaging said sun gear, a barrier drive gear fixed to said first arm, rotation axis of said barrier drive gear coincides of the rotation axis of said first arm, said sun gear being connected to said first gear train, said planetary gear being movable between a first and second positions, said planetary gear being engaged with said second gear train when located at said second position and disconnected therefrom when moved away from said second position, said barrier drive gear being connected to said barrier opening/closing mechanism, said barrier opening/closing mechanism being driven when said planetary gear moves between said first and second positions.

* * * * *